July 24, 1956 G. D. SMOLIAR 2,756,170
METHOD OF STABILIZING THE INDUCTANCE OF AN INDUCTOR ASSEMBLAGE
Filed April 22, 1954 3 Sheets-Sheet 1

DELAY LINE 1

INVENTOR.
GERALD D. SMOLIAR
BY S.C. Yuter
ATTORNEY.

July 24, 1956    G. D. SMOLIAR    2,756,170
METHOD OF STABILIZING THE INDUCTANCE OF AN INDUCTOR ASSEMBLAGE
Filed April 22, 1954    3 Sheets-Sheet 2

INVENTOR.
GERALD D. SMOLIAR
BY S.C. Yutte
ATTORNEY

United States Patent Office 2,756,170
Patented July 24, 1956

2,756,170

METHOD OF STABILIZING THE INDUCTANCE OF AN INDUCTOR ASSEMBLAGE

Gerald D. Smoliar, Brooklyn, N. Y., assignor to Underwood Corporation, New York, N. Y., a corporation of Delaware Application April 22, 1954, Serial No. 424,952

8 Claims. (Cl. 148—121)

This invention relates to inductors and more particularly to a method of stabilizing the inductance of an inductor assemblage suitable for use in delay lines of the lumped parameter type.

A lumped parameter delay line, in one form, consists of a plurality of windings in series, with a capacitor connecting a tap on each winding to a common connector. The portions of the windings between adjacent taps function as inductors. Each inductor with its associated capacitors constitutes one electrical section of the delay line.

The self inductance of each section of the delay line is a function of the number of turns and the dimensions and shape of the coil winding of each inductor, and the permeability of the coil winding core. The mutual inductance between adjacent inductors of each section is determined by the value of their self inductances and the physical relationships of the windings to each other. It has been found that a particular value of mutual inductance between the inductors of adjoining sections will result in a delay line having optimum electrical characteristics, and the value of mutual inductance is relatively critical.

When it is required that the self inductance (hereinafter called the inductance) per section be larger than a few hundred microhenries, the windings may be mounted on magnetic cores.

The magnetic core increases the inductance per section without increasing the number of turns. However, when the coil windings are on a common magnetic core, the resultant mutual inductance between sections is generally much higher than the optimum value, and the electrical characteristics of the delay line are found to be unsatisfactory.

This problem has been solved by a lumped parameter delay line of the type described and claimed in the copending application of Samuel Lubkin, Serial No. 289,236, filed May 22, 1952, and assigned to the same assignee. In this delay line a plurality of cylindrical cores of magnetic material, each having a circularly grooved face and a plane face, are arranged cylindrically on a mounting member with the grooved face of one core adjacent to the plane face of the next core. The cores are separated from each other by non-magnetic spacers. A tapped coil winding is mounted within the groove of each core. A plurality of capacitors is supported near the cores and each capacitor connects a tap on each winding to a common connecting bus.

The portion of the winding between each pair of adjacent taps is the inductor of the associated electrical section of the delay line. The inductance of each inductor is determined primarily by the thickness of the non-magnetic spacer since the major part of the reluctance in the flux path is the reluctance between the cores.

The total delay of a delay line is a function of the inductance of its inductors and thus the electrical characteristics of a delay line of this type are determined principally by the thickness of the spacers between the cores and the positions of the taps on the windings.

As the gap occupied by each spacer is relatively small, (for example, five thousandths of an inch), a small change in the thickness of the spacers will substantially change the inductance and therefore the delay of the delay line. Thus, this type of construction provides a very simple way of adjusting the delay since the spacers can be changed after the delay line is assembled.

In delay-line applications requiring extremely accurate delays, the delay should not vary by more than one percent after the initial adjustment of the delay line. In some high-precision applications, this stability requirement is even more severe.

Unfortunately, it has been found that normal handling and aging of delay lines produces changes of delay in the order of one to three percent, particularly in the larger delay lines. This variation appears to be due to a decrease of the length of the gaps between the magnetic cores of each inductor.

Shock treatment, vibration treatment, and increased compression on the spacers do not adequately solve the stability problem.

An object of the invention, therefore, is to provide an improved method of stabilizing the electrical characteristics of an inductor assemblage.

Another object of the invention is to provide an improved method of minimizing the change of delay which can occur as a result of the handling and usage of electrical delay lines.

A further object of the invention is to provide a method of stabilizing the delay of delay lines of the lumped parameter type which employ inductors wound on spaced magnetic cores.

The invention will be described, by way of example only, in connection with the delay line of the lumped parameter type described in the above-cited application.

In accordance with the preferred embodiment of the invention, the inductance of the inductor assemblage is stabilized by heating the inductor assemblage, cooling the inductor assemblage, and repeating the heating and cooling steps.

Other objects and advantages will appear in the subsequent detailed description which is accompanied by a drawing wherein.

Figure 1:
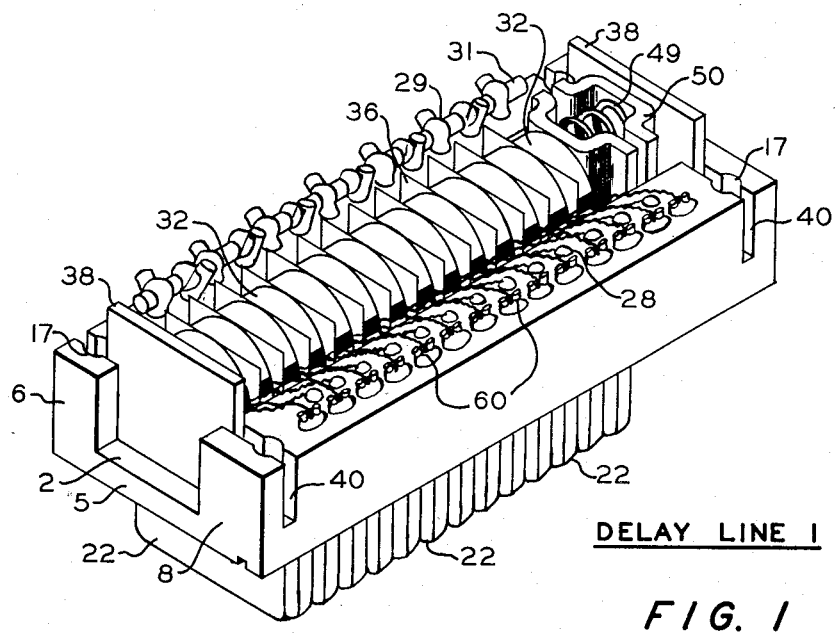
Fig. 1 is a perspective view of a delay line which may be stabilized in accordance with the invention.

Referring more particularly to Fig. 1, the delay line 1 generally comprises the elongated U-shaped mounting member 2 which supports coil windings positioned in the cores 32 and capacitors 22 mounted beneath it.

The mounting member 2 comprises a base 5 and two legs 6 and 8. This shape may easily be achieved by milling out a rectangular cross section or channel from a solid block of material. The mounting member 2 may be constructed from a material having good electrical insulating and mechanical properties; for example, a phenolic material having a fabric base to provide mechanical strength.

Mounting holes 17 at each end of the mounting member 2 are used to mount a cover plate (not shown) over the top portion of the delay line. The cover plate also rigidly positions the components mounted on the top of the mounting member 2. A second covering plate may be similarly mounted over the capacitors 22 beneath the mounting member 2 to maintain them in a rigid position.

The capacitors 22 are closely arranged beneath the base 5 of the mounting member 2. The leads of the capacitors 22 extend through holes in the legs 6 and 8 of the mounting member 2 and may be bent angularly at the exit of the holes in order to support the capacitors 22 in position. The leads function (in place of separate terminal posts) to receive the coil winding leads. The holes are chosen to be of such a diameter that the frictional contact of the leads with the inside surfaces of the holes also assists in supporting the capacitors in position during assembly.

The capacitors 22 are further maintained in position with their upper edges in surface-to-surface contact with the lower surface of base 5 by the solder portions 28 and 29 which are utilized for electrical and mechanical connections. The ends of the leads are preferably bent substantially normal to the outer edge of the leg 6 and alternately toward and away from the edge in order to provide mechanical support for connecting bus 31 before soldering. After soldering, the leads may be clipped close to the solder joint. The solder portions together with the leads are of a larger cross section than the diameter of the holes and also function, in conjunction with the bus 31 connecting the bent ends of the leads together, to prevent any forced withdrawal of the capacitors 22 from the holes. The cores 32 are arranged adjacent to each other between the legs 6 and 8 of the mounting member 2. The cores 32 each have a circularly grooved portion at one end to receive a coil winding. The leads of the coil windings are connected either to the tie points 60 or to the leads of the capacitors which pass through leg 8.

The cores 32 (known at pot cores) are stacked on a common axis to form an elongated cylindrical assembly and are spaced from each other by spacer sheets 36. The spacer sheets are preferably of mica but other magnetic or non-magnetic materials are also suitable, for example, Teflon.

The cores 32 are arranged between the identical end retaining plates or pieces 38. The end plates 38 are rigidly mounted in the transverse slots 40 which are of equal depth and are cut into the legs 6 and 8 on lines parallel to the ends of the member 2.

The spring retainer plates 50, arranged between the legs 6 and 8 and adjacent to one end plate 38, are of a spread U-shape. The purpose of this U-shape is to permit the insertion of a suitable tool to compress the spring 49 between the retainer plates in order to insert or remove individual inductor assemblages or mica spacers. Each retainer plate has a rounded boss in the center thereof which functions to retain the spring 49 mounted in position and to prevent lateral movement.

All the components between the legs of the mounting member are held in position by the force exerted due to the compression of the spring 49. In particular, a continuing pressure is maintained on the spacers 36 in order to prevent the gap between the pot cores 32 from increasing.

Figure 2:
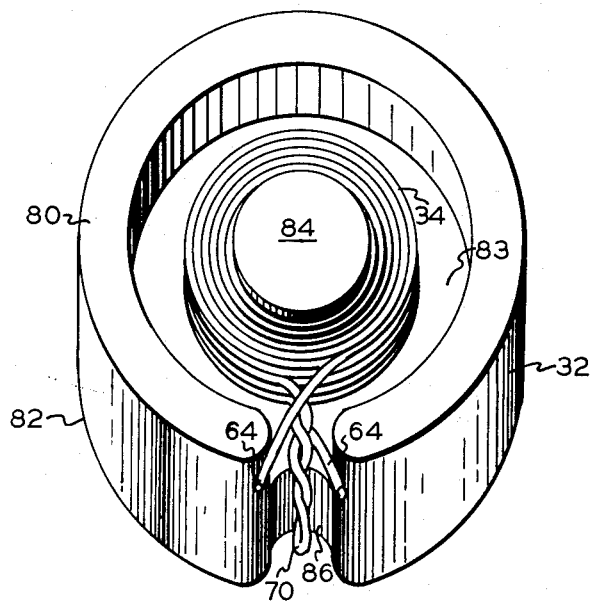
Fig. 2 is a perspective view of one part of a delay line section showing the coil winding construction of the delay line illustrated in Fig. 1.

Referring to the core and coil winding assemblage in Fig. 2, a portion of an inductor is shown. The core 32, made from a material having a high permeability and preferably of a low electrical conductance (a ferrite, for example), has a circularly grooved face 80 and a plane face 82. The coil winding 34 mounted on the hub 84 is cemented in position completely within the groove 83 of the pot core 32.

The tap 70 which is connected to a turn of the coil winding may be conveniently produced by twisting a portion of the wire of the coil winding to a suitable lead length at the appropriate time and position during winding of the coil. The end leads 64 of the winding are arranged near the tap 70 and the coil is mounted with the three leads extending through the opening 86 in one sector of the score 32.

Figure 3:
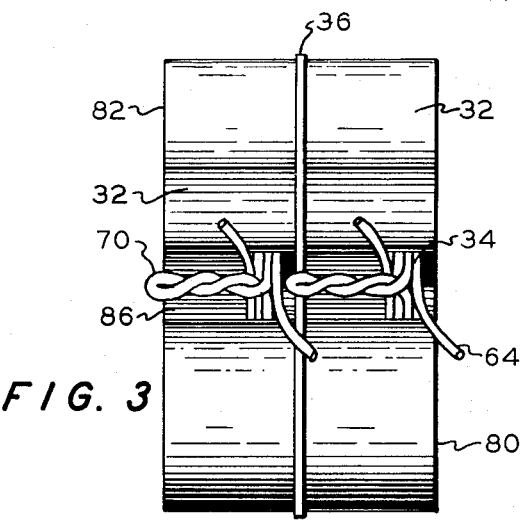
Fig. 3 is an elevational view of the inductor assemblage which includes the inductor of one section of the delay line.

The cores 32 are cylindrically arranged adjacent to each other with the grooved face of one core next to the plane face of the next succeeding core as shown in Fig. 3.

The spacer 36, which is mounted between the cores 32, is preferably of a square shape with the length of each side approximately equal to the diameter of the cores. If necessary, the spacer may be made slightly larger in order to aid in eliminating variations in spacing of the cores due to burrs at the edges of the spacers.

Figure 5:
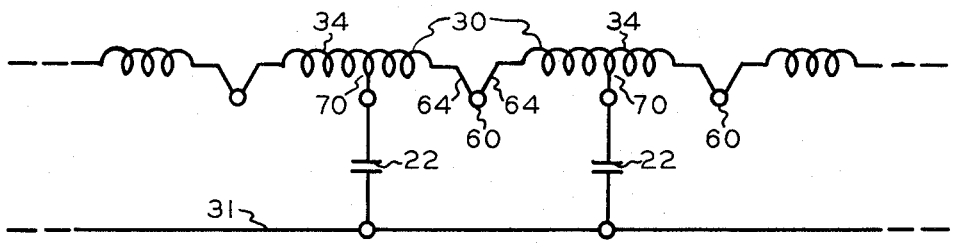
Fig. 5 illustrates the electrical equivalent of a portion of the delay line shown in Fig. 1.

The equivalent of an electrical section of the delay line 1 is shown in Fig. 5 where corresponding electrical parts of the delay line are designated by the same reference characters as are utilized in the description of the mechanical construction above.

The coil windings 34 are in series connection, and the capacitors 22 are connected from the taps 70 to the common connection 31. With this arrangement an electrical section of the delay line includes inductor 30 comprising segments of two adjoining coil windings between the taps 70, and half of the capacitance of the capacitors connected to the taps. Therefore, in an electrical sense, the inductor 30 of one section of the line is made up of contributions of inductance from the adjacent windings. Each capacitor contributes half of its capacitance to each of the adjoining sections. The end capacitors are chosen to have substantially half the capacity of the intermediate capacitors. Actual calculation indicates that for the usual assumptions the end capacity should be about 0.47 times the capacity of the intermediate capacitors for best results. The end leads 64 of the adjacent coil windings 34 are connected together at the tie point 60.

Summarizing, each coil winding 34 which comprises a complete tapped winding in a single core, contributes a portion of the inductance to two sections of the delay line. Therefore, mutual inductance exists between the adjacent sections, and is of an amount which is a function of the position of the tap, since the tap position will determine the ratio of turns between adjacent sections. For example, if the tap is close to one end of the winding, the mutual inductance is small, but if the tap is near the center of the winding, the mutual inductance is large.

Close control over the inductance of each section is necessary in order to design and manufacture delay lines to particular specifications. Due to variations in the construction of the coil windings and the cores, and to the lack of complete uniformity of the magnetic properties of the core material, it is somewhat difficult to predict accurately the inductance of each core and coil winding combination. A very convenient and simple way is provided to adjust for any small variation in the requisite inductances.

Figure 4:
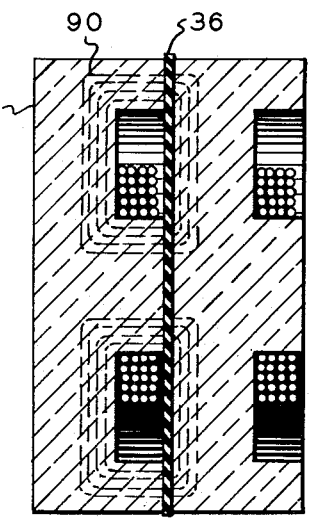
Fig. 4 is a cross sectional view of Fig. 3 along the vertical diameter of the inductor assemblage.

Referring to Fig. 4, which illustrates a cross section of the inductor assemblage of Fig. 3, the major portion of the magnetic circuit of each inductor comprises the continuous path 90 perpendicular to the turns of and around a cross section of the coil winding and through the two adjacent cores. That is, the back of the next succeeding core provides a portion of the flux path.

Since the core material has a relatively high permeability, the major part of the reluctance in the flux path is in the gap between the hub 84 and the back of the adjacent core occupied by the non-magnetic spacer 36. If the gap is relatively small, (for example, five thousandths of an inch), a small change in the gap will substantially affect the inductance.

After the delay line is assembled the inductance is easily adjusted by varying the gap between cores by the simple expedient of inserting spacers of varying thickness between the inductors. Thus minor differences in inductance may be compensated for, and uniformity of inductance may be obtained.

It has been noted that after handling and usage of a delay line its inductance tends to increase. This has been attributed to small decreases in the size of the gaps between the cores due to "setting." The increase in inductance causes a corresponding increase in delay.

In many delay line applications, the change in delay does not affect the operation of the circuitry. However, where extremely precise delays are required, it is necessary that the delay line be permanently set before usage so that further delay changes will not exceed the tolerance requirements of the circuitry.

It has been discovered that the delay of a delay line of the lumped parameter type can be permanently set and therefore stabilized by repeatedly varying the temperature of the delay line.

More particularly, and in accordance with a preferred embodiment of the invention, the inductance of each inductor assemblage can be increased to a final inductance value which is extremely stable by repeatedly heating and cooling the inductor assemblage.

This phenomenon is illustrated by Table I which shows the percentage change of the inductance of a sample of five inductor assemblages.

TABLE I

*Percentage change of inductance*

| Heat Cycle | Sample 1 | | Sample 2 | | Sample 3 | | Sample 4 | | Sample 5 | |
|---|---|---|---|---|---|---|---|---|---|---|
| | Change per Cycle | Total Change | Change per Cycle | Total Change | Change per Cycle | Total Change | Change per Cycle | Total Change | Change per Cycle | Total Change |
| 1st | +1.65 | +1.65 | +1.2 | +1.2 | +0.7 | +0.7 | +0.45 | +0.45 | +2.05 | +2.05 |
| 2nd | +0.5 | +2.15 | +0.4 | +1.6 | +0.5 | +1.2 | +0.65 | +1.10 | +0.35 | +2.40 |
| 3rd | +0.2 | +2.35 | +0.0 | +1.6 | +0.4 | +1.6 | +0.05 | +1.15 | +0.20 | +2.60 |
| 4th | +0.1 | +2.45 | +0.2 | +1.8 | −0.2 | +1.4 | +0.1 | +1.25 | +0.05 | +2.65 |
| 5th | +0.2 | +2.65 | +0.15 | +1.95 | +0.2 | +1.6 | −0.05 | +1.20 | +0.15 | +2.80 |
| 6th | +0.15 | +2.8 | +0.0 | +1.95 | −0.05 | +1.55 | +0.0 | +1.20 | +0.10 | +2.90 |

In all cores the total inductance change is between plus one percent and plus three percent. In general, as can be seen from Table I, increasing the number of heat cycles tends to increase the inductor stability. From the standpoint of engineering economy three cycles are sufficient since the fourth cycle only shows an average increase of +0.13 percent. However, even after as many as five cycles, an average instability of +0.04 percent remains.

It has also been found that the larger the gap size the smaller the change in inductance after stabilization by heat cycling.

The significant factors appear to be the repeated change in temperature and the amount of each variation rather than the direction of change. The amount of each variation is not critical. However, as will be more readily apparent hereinafter, a single heating and cooling cycle produces substantial stabilization.

The following examples show three typical applications of the invention to delay line stabilization.

It should be noted that the temperatures indicated are not critical and are given by way of example only. Temperature variations per cycle in the range of one hundred to two hundred fifty degrees centigrade are suitable.

The delay line may be heated in a suitable oven until a proper temperature is reached as indicated by a thermometer or other temperature indicator.

The delay line may be cooled outside the oven until about room temperature is reached. Forced cooling by fan or blower may be employed to increase the rate of cooling.

EXAMPLE 1

Figure 6:
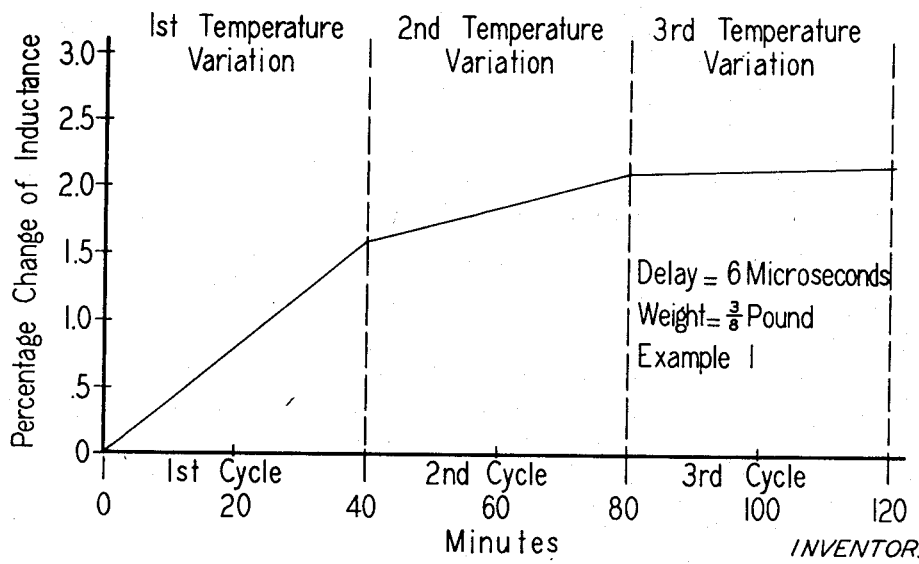
Fig. 6 is a graph illustrating the change in electrical characteristics of a delay line of the type shown in Fig. 1 during the stabilization process in accordance with one embodiment of the invention.

Referring to the graph in Fig. 6, the percentage change of inductance of a delay line having a delay of six microseconds and a weight of ⅜ of a pound is illustrated. The delay line is heat cycled three times, each cycle taking about forty minutes.

In this example the temperature is varied during each cycle through about one hundred sixty degrees; that is, from 20° centigrade (around room temperature) to about 100° centigrade and back to 20° centigrade. About twenty minutes are required during the increasing temperature portion of the cycle and about twenty minutes are required during the cooling portion of the cycle. The percentage change of inductance after the first cycle is about 1.6 percent. Cooling is preferably done by forcing air over the delay line.

After the delay line has cooled down to room temperature it is again heated and cooled in a similar manner. The second heat cycle produces a change of about .6 percent, making a total change in the order of 2.2 percent.

The heat cycle is repeated a third time. After the third heat cycle only a small change of inductance occurs indicating that the delay line is stabilized.

The final change in inductance is about .1 percent making a total inductance variation from before stabilization to after stabilization of about 2.3 percent. Since the total percentage change of delay is one-half the total percentage change of inductance (for small changes), the delay increases about 1.15 percent.

The delay line of Example 1 is similar in size and construction to the delay line 1 illustrated in Fig. 1.

It should be noted that the spring which maintains the inductor assemblages in position should be strong enough to take up the decrease in gap spacing during the stabilization process.

EXAMPLE 2

Figure 7:
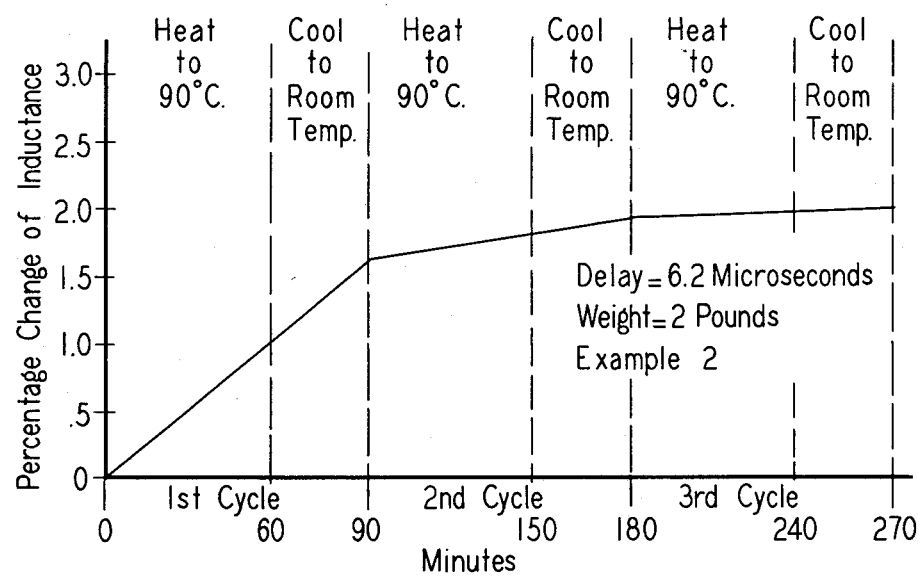
Fig. 7 is a graph showing the percentage change of inductance during the stabilization of another delay line in accordance with another embodiment of the invention.

Referring to the graph of Fig. 7, the stabilization of a delay line having a delay of 6.2 microseconds and a weight of two pounds is illustrated. Because of the weight about sixty minutes are required during which to heat the delay line from room temperature to about 90° centigrade and thirty minutes are required to cool the delay line back to room temperature making a total temperature variation through one hundred forty degrees per cycle. Cooling is usually accelerated by forcing air over the delay line.

During the first cycle of the stabilization process the delay line changes inductance by about 1.6 percent. The percentage change of inductance is increased to about 1.9 percent after the second cycle and levels off at about 2.0 percent after the third cycle. The total stabilization process takes about 270 minutes for a delay line of this type.

EXAMPLE 3

Figure 8:
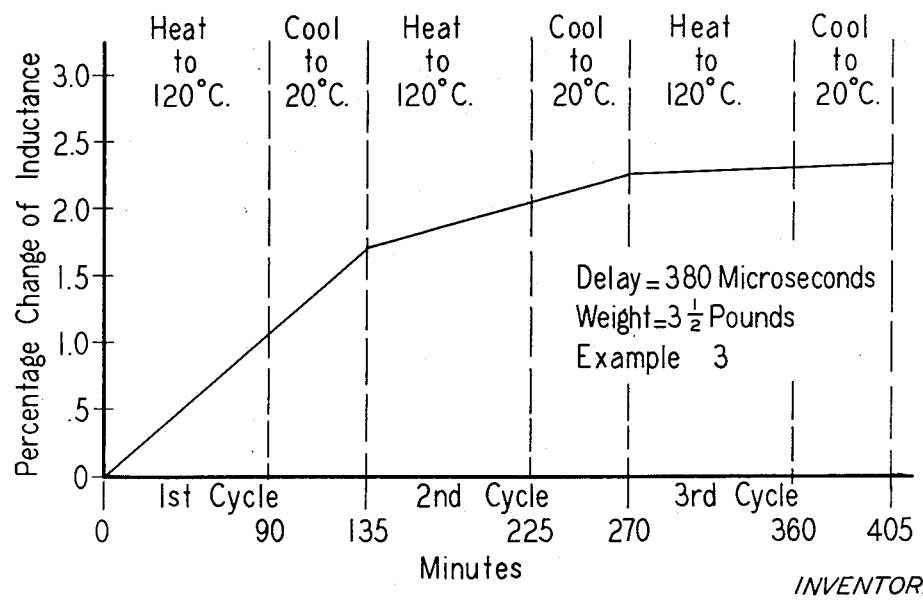
Fig. 8 is a graph illustrating the percentage change of inductance during the stabilization of still another delay line in accordance with a further embodiment of the invention.

Referring to the graph in Fig. 8 the percentage change of inductance during the stabilization of a delay line having a delay of 380 microseconds and a weight of 3½ pounds is shown. Because of the weight each cycle lasts about 135 minutes, 90 minutes being required to heat the delay line from room temperature to about 120° centigrade and about 45 minutes being required to cool the delay line back to room temperature by forced draft cooling. Thus, the total temperature variation per cycle is in the order of two hundred degrees.

At the end of the first cycle the percentage change of inductance is in the order of 1.75 percent. At the end of the second cycle the change has increased to about 2.25 percent, and stabilizes at about 2.3 percent at the end of the third cycle. The complete stabilization process lasts about 405 minutes.

Therefore, in accordance with the invention an improved method of stabilizing the electrical characteristics of an inductor assemblage has been provided. More particularly, a method of stabilizing the delay of delay lines of the lumped parameter type employing inductors wound on spaced magnetic cores has been indicated.

An advantage of the invention is that delay lines can be stabilized so that the electrical characteristics remain constant with a high degree of precision and the effects of later variations due to usage and aging minimized or eliminated.

There will now be obvious to those skilled in the art many modifications and variations utilizing the principles set forth and realizing many or all of the objects and advantages of the methods described but which do not depart essentially from the spirit of the invention.

What is claimed is:

1. The method of stabilizing the inductance of an inductor assemblage comprising the steps of heating the inductor assemblage from room temperature to a temperature in the range of about 90° to about 120° centigrade, then cooling the inductor assemblage to about room temperature, and repeating the heating and cooling steps.

2. The method of stabilizing the delay of a lumped parameter delay line which includes inductor assemblages consisting of coil windings on adjacent magnetic cores separated by non-magnetic spacers comprising the steps of heating the delay line for about twenty minutes to a temperature of about 100° centigrade, cooling the delay line for about twenty minutes to a temperature of about 20° centigrade, and then repeating the heating and cooling steps twice.

3. The method of stabilizing the delay of a lumped parameter delay line which includes inductor assemblages consisting of coil windings on adjacent magnetic cores separated by non-magnetic spacers comprising the steps of heating the delay line for about sixty minutes to a temperature of about 90° centigrade, cooling the delay line for about thirty minutes to room temperature, and then repeating the heating and cooling steps twice.

4. The method of stabilizing the delay of a lumped parameter delay line which includes inductor assemblages consisting of coil windings on adjacent magnetic cores separated by non-magnetic spacers comprising the steps of heating the delay line for about ninety minutes to a temperature of about 120° centigrade, cooling the delay line for about forty-five minutes to a temperature of about 20° centigrade, and then repeating the heating and cooling steps twice.

5. The method of stabilizing the inductance of an inductor assemblage consisting of coil windings on two adjacent magnetic cores separated by a non-magnetic spacer comprising increasing the temperature of the inductor assemblage from room temperature to a temperature in the range of about 90° to 120° centigrade for a period of time in the range of about 20 minutes to about 90 minutes, then cooling the inductor assemblage to room temperature.

6. The method of stabilizing the inductance of an inductor assemblage comprising increasing the temperature of the inductor assemblage from ambient temperature to a temperature in the range of about 90° to about 120°, and decreasing the temperature of the inductor assemblage to ambient temperature.

7. The method of stabilizing the delay of a lumped parameter delay line which includes inductor assemblages consisting of coil windings on adjacent magnetic cores separated by non-magnetic spacers comprising the steps of heating the delay line for a period of time in the range of about 20 to 90 minutes to a temperature in the range of about 90° to 120°, cooling the delay line to room temperature, and then repeating the heating and cooling steps.

8. The method of stabilizing the delay of a lumped parameter delay line which includes inductor assemblages consisting of coil windings on adjacent magnetic cores separated by non-magnetic spacers comprising heating the delay line for a period of time in the range of 20 to 90 minutes to a temperature in the range of about 90° to 120° centigrade, cooling the delay line for a period of time in the range of about 20 to about 45 minutes to room temperature, and then repeating the heating and cooling steps.

References Cited in the file of this patent

UNITED STATES PATENTS

| | | |
|---|---|---|
| 2,401,730 | Green | June 11, 1946 |
| 2,414,462 | Grace et al. | Jan. 21, 1947 |
| 2,639,246 | Dunlap | May 19, 1953 |